(12) United States Patent
Barber (10) Patent No.: US 8,174,142 B2
(45) Date of Patent: May 8, 2012

(54) WIND TURBINE WITH PAIRED GENERATORS

(76) Inventor: Gerald L. Barber, Greenville, SC (US)

(*) Notice: Subject to any disclaimer, the term of this patent is extended or adjusted under 35 U.S.C. 154(b) by 440 days.

(21) Appl. No.: 12/492,187

(22) Filed: Jun. 26, 2009

(65) Prior Publication Data

US 2010/0264663 A1    Oct. 21, 2010

Related U.S. Application Data

(63) Continuation-in-part of application No. 12/426,494, filed on Apr. 20, 2009, now Pat. No. 8,109,727, and a continuation-in-part of application No. 12/432,837, filed on Apr. 30, 2009, now Pat. No. 7,825,532, and a continuation-in-part of application No. 12/481,817, filed on Jun. 10, 2009.

(51) Int. Cl.
*F03D 9/00* (2006.01)
*H02P 9/04* (2006.01)
*F03D 7/02* (2006.01)
*B63H 1/06* (2006.01)

(52) U.S. Cl. ............ 290/55; 290/44; 416/41; 416/132 B (58) Field of Classification Search .................. 290/44, 290/55; 416/41, 132 B
See application file for complete search history.

(56) References Cited

U.S. PATENT DOCUMENTS

| | | | | |
|---|---|---|---|---|
| 677,747 A | * | 7/1901 | Sterzing | 416/13 |
| 1,233,232 A | | 7/1917 | Heyroth | 290/55 |
| 1,334,485 A | * | 3/1920 | Clipfell et al. | 290/55 |
| 1,915,689 A | | 8/1932 | Moore | 416/117 |
| 1,944,239 A | | 1/1934 | Honnef | 290/55 |
| 3,942,839 A | * | 3/1976 | Chalk | 301/73 |
| 4,003,676 A | | 1/1977 | Sweeney et al. | 416/132 B |
| 4,111,601 A | | 9/1978 | Richard | 416/41 |
| 4,122,793 A | * | 10/1978 | Molz | 114/106 |
| 4,319,865 A | | 3/1982 | Richard | 416/41 |
| 4,330,714 A | | 5/1982 | Smith | 290/55 |
| 4,350,895 A | * | 9/1982 | Cook | 290/55 |
| 4,364,708 A | | 12/1982 | David | 416/132 B |
| 4,417,853 A | * | 11/1983 | Cook | 416/132 B |
| 4,729,716 A | * | 3/1988 | Schmidt | 416/10 |
| 6,064,123 A | | 5/2000 | Gislason | 290/55 |
| 6,091,161 A | | 7/2000 | Dehlsen et al. | 290/43 |

(Continued)

FOREIGN PATENT DOCUMENTS

EP    0015131    9/1980

(Continued)

OTHER PUBLICATIONS

International Search Report and Written Opinion dated Jul. 2, 2010.

(Continued)

*Primary Examiner* — Pedro J Cuevas
(74) *Attorney, Agent, or Firm* — Thomas, Kayden, Horstemeyer & Risley, LLP (57) ABSTRACT

A wind turbine 20 has a turbine wheel 22 with a perimeter rim 24 and/or an intermediate rim 117 that are concentric with the axis of rotation of the turbine wheel. Electrical generators 46 and 48 are placed in engagement with the rims, with the generators formed in pairs that engage opposite surfaces of the rims. The electrical generators are mounted so that they may move laterally in response to the axial "wobble" likely to occur in the rims of the turbine wheel.

17 Claims, 10 Drawing Sheets

U.S. PATENT DOCUMENTS

| | | | | |
|---|---|---|---|---|
| 6,155,785 A * | 12/2000 | Rechnagel et al. | ........ | 416/196 A |
| 6,951,443 B1 | 10/2005 | Blakemore | .................... | 415/4.3 |
| 6,979,171 B2 | 12/2005 | Lauritsen | ........................ | 415/4.3 |
| 7,098,552 B2 | 8/2006 | McCoin | ........................... | 290/44 |
| 7,156,037 B2 | 1/2007 | Borgen | ........................ | 114/264 |
| 7,218,011 B2 | 5/2007 | Hiel et al. | ........................ | 290/43 |
| 7,331,762 B2 | 2/2008 | Fraenkel | ........................ | 416/85 |
| 7,358,624 B2 | 4/2008 | Bacon | ............................. | 290/55 |
| 7,825,532 B1 * | 11/2010 | Barber | ............................ | 290/55 |
| 8,053,919 B1 * | 11/2011 | Sheth et al. | ....................... | 290/55 |
| 2003/0168864 A1 | 9/2003 | Heronemus et al. | ............ | 290/55 |
| 2003/0227174 A1 | 12/2003 | Bayly | ............................ | 290/55 |
| 2006/0012182 A1 | 1/2006 | McCoin | .......................... | 290/55 |
| 2006/0275121 A1 | 12/2006 | Merswolke et al. | ...... | 416/132 B |
| 2007/0024060 A1 | 2/2007 | Bacon | ............................. | 290/55 |
| 2007/0166159 A1 | 7/2007 | Williams | ........................ | 416/10 |
| 2008/0003105 A1 | 1/2008 | Nies | ................................ | 416/95 |
| 2009/0096217 A1 | 4/2009 | Watson | ........................... | 290/55 |
| 2010/0244456 A1 * | 9/2010 | Cai | ................................. | 290/55 |
| 2010/0264661 A1 * | 10/2010 | Barber | ............................ | 290/55 |
| 2010/0264662 A1 * | 10/2010 | Barber | ............................ | 290/55 |
| 2010/0264667 A1 * | 10/2010 | Barber | ............................ | 290/55 |
| 2010/0266407 A1 * | 10/2010 | Barber | ............................ | 416/85 |
| 2010/0266412 A1 * | 10/2010 | Barber | ........................... | 416/147 |
| 2010/0295307 A1 * | 11/2010 | Barber | ............................ | 290/52 |
| 2010/0295317 A1 * | 11/2010 | Mahawili | ........................ | 290/55 |
| 2011/0068729 A1 * | 3/2011 | Barber | ........................... | 318/538 |

FOREIGN PATENT DOCUMENTS

| | | |
|---|---|---|
| GB | 2 100 688 | 1/1983 |
| JP | 2009-030586 | 12/2009 |
| WO | WO 03/046376 | 6/2003 |

OTHER PUBLICATIONS

International Search Report and Written Opinion dated Jun. 30, 2010.
International Search Report and Written Opinion dated Jun. 18, 2010.
International Search Report and Written Opinion dated Jun. 16, 2010.
International Search Report and Written Opinion dated Jun. 15, 2010.

* cited by examiner

WIND TURBINE WITH PAIRED GENERATORS

CROSS REFERENCE TO RELATED APPLICATION

This is a continuation-in-part of U.S. patent application Ser. No. 12/426,494, filed on Apr. 20, 2009, now U.S. Pat. No. 8,109,727 and of Ser. No. 12/432,837, filed Apr. 30, 2009, now U.S. Pat. No. 7,825,532 and of Ser. No. 12/481,817, filed on Jun. 10, 2009.

FIELD OF THE INVENTION

This invention concerns a wind turbine assembly for generating electricity in response to the movement of atmospheric wind.

BACKGROUND OF THE INVENTION

Windmills have been used for many generations for the purpose of pumping water from the ground and for generating electricity. A basic advantage of the windmill is that it uses the power of atmospheric wind to rotate a wheel having radially extending blades. This rotary movement may be converted into various useful purposes. For example, wind turbines in the form of propellers mounted on towers have been placed in areas where steady winds are prevalent and the wind turbines are used to generate electricity. An electrical generator usually is positioned near the axis of rotation of the propellers, adding the weight of the generator to the upper portion of the mast of the assembly The blades of the conventional large wind turbines are large and made of expensive rigid material and are constructed to have the blades extend radially from a central hub, with no extra support at the outer tips of the blades. The conventional wind turbine blades rotate at a high rate of revolutions and must withstand both the centrifugal forces generated by the fast revolution of the blades and the cantilever bending forces applied to the blades by the wind. Since the outer portions of the blades usually move at a very high velocity and are engaged by strong winds, the larger the blades the stronger they must be and the more expensive they become. Thus, there is a practical limit as to the length and width of the blades.

Another wind turbine type has rigid propellers that appear to be rigidly mounted to circular perimeter rims that support the outer ends of the propellers, as shown in U.S. Pat. Nos. 1,233,232 and 6,064,123. Rubber tires or other rotary objects are placed in positions to engage the outer rim so as to rotate the rubber tires, with the driven tires rotating the rotor of a generator. Thus, the rotation of the wind turbine is used to generate electricity.

The perimeter rim of a large wind turbine is likely to rotate in an irregular circular path so that at one position about the path of the rim the rim appears to wobble in an axial direction, parallel to the axis of rotation of the turbine wheel. This irregular rotation may be caused by several conditions, such as by wind turbulence, a change in wind velocity, equipment vibration, changes in wind direction, and imprecise formation and/or warping of the perimeter rim and its supporting structure. The larger the diameter of the wind turbine, the more likelihood of rotation of the rim in an irregular path and the more likelihood of greater amplitude of the axial displacement of the irregular movement of the perimeter rim.

One of the advantages of a turbine wheel with a perimeter rim is that the electrical generator(s) may be positioned at the rim at the lower arc of rotation of the rim where the generators are closer to the ground or other low supporting surface to remove the weight of the generator from the upper portion of the mast. Also, the position of the generator at a rim of the turbine wheel gives more access for installation, maintenance, repair and replacement of the generator. However, if the perimeter rim of the wind turbine wobbles during operation, it may be difficult to maintain the generator in proper alignment with the rim and it appears likely that stress between the generator and the turbine wheel will occur. Also, if multiple ones of the generators are placed in operative locations about an arc of the rim of the turbine, the potential problems caused by the wobbling rim appear likely to be more prevalent.

While is desirable to make a wind turbine that does not wobble during rotation, from a practical viewpoint it is likely that even the more perfect wind turbines will wobble to some extent when rotating. Accordingly, it would be desirable to have a connection between the rim of a wind turbine and one or more electrical generators that accommodates the rotation of the rim when the rim tends to wobble in an axial direction.

SUMMARY OF THE DISCLOSURE

Briefly described, this disclosure concerns a wind turbine assembly for generating electricity that includes a turbine wheel mounted on a support and rotatable about a laterally extending central axis, the turbine wheel including a circular rim concentric with and rotatable about the central axis, and an electrical generator in driven relationship with the circular rim.

The wind turbine may also include sail wings formed of fiberglass or other relatively flexible material, with shape control means carried by the turbine wheel for rotating at least one of the ends of the sail wings about the longitudinal axis of the sail wings to form a pitch or twist in the sail wings.

The wind turbine may also include a moveable support configured for supporting an electrical generator and for moving the electrical generator in response to the change in axial position of the circular rim of the turbine wheel at the position of the electrical generator. The moveable support may include a pair of wheels straddling the circular rim and in driving relationship with the electrical generator.

The wind turbine assembly may further include a guide wheel in engagement with the circular rim for moving the electrical generator in response to the change in axial position of the circular rim at the position of the electrical generator.

The wind turbine may include a biasing means for urging the guide wheel into contact with the circular rim. The biasing means may include air bellows, coil springs or other means by which the wobbling of the circular rim is accommodated.

A positioning wheel may be carried by a movable support, with the positioning wheel making contact with the circular rim for moving the movable support in response to the change of position of the circular rim at the movable support. In addition to the positioning wheel, at least one driving wheel carried by the movable support may be placed in contact with the circular rim and connected to the electrical generator for driving the electrical generator in response to the rotation of the wind turbine wheel. The positioning wheel keeps the driving wheel in contact with the rim of the turbine wheel.

Other features and advantages of the structure and process disclosed herein may be understood by reading the following specification in view with the accompanying drawings.

DETAILED DESCRIPTION

Figure 1:
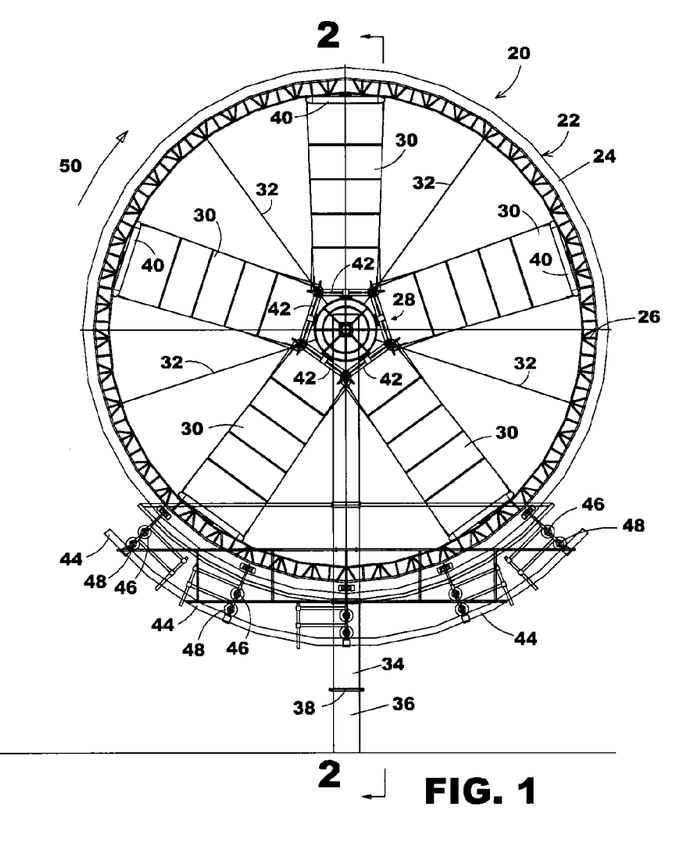
FIG. 1 is a front elevational view of a wind turbine, according to this description.

Referring now in more detail to the drawings in which like numerals indicate like parts throughout the several views, FIG. 1 discloses a wind turbine 20 that includes a turbine wheel 22 and has a perimeter rim 24 and a perimeter framework 26 that supports the perimeter rim. The perimeter framework is a network of angle braces 26 which supports the outer circular perimeter rim 24. The outer circular perimeter rim may be formed of arcuate segments.

The axle structure 28 at the center of the perimeter rim defines a central axis of rotation and a plurality of sail wing assemblies 30 extend between the axle structure 28 and the perimeter framework 26, with the sail wings extending radially from the axle structure. A plurality of cables 32 extend from the axle structure radially outwardly to the perimeter framework 26 and hold the perimeter framework in place.

Figure 2:
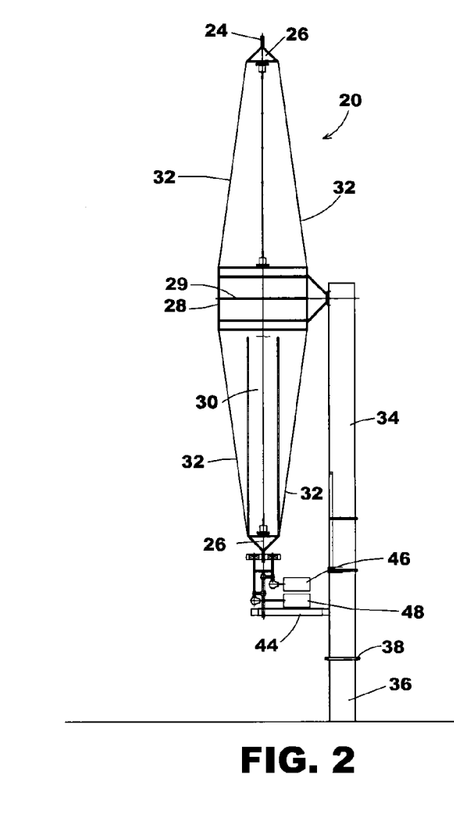
FIG. 2 is a side cross sectional view of the wind turbine of FIG. 1.

As shown in FIG. 2, the plurality of cables 32 converge inwardly as they extend from the axle structure 28 toward the perimeter framework 26, providing both radial and axial support for the perimeter framework 26 and the perimeter rim 24. The axle structure is mounted on an upright mast 34, with the mast mounted on a ground support 36. The mast may be rotated at the junction 38 between the mast 34 and ground support 36, so as to face the turbine wheel into the oncoming wind.

Each of the sail wing assemblies 30 are rotatable about their longitudinal axis by pivotal mounting of the outer sail end supports 40 and inner sail end supports 42. The sail end supports 40 and 42 are each mounted intermediate their ends to bearings that are supported by the perimeter framework 26 so that the sail end supports 40 and 42 rotate the sail wing assemblies about their respective longitudinal axes to adjust the pitch and twist of the sail wing assemblies so as to form the most desirable configuration of the sail wing assemblies for catching the atmospheric wind.

FIGS. 1 and 2 also show at least one electrical generator supported at the bottom arc of rotation of the perimeter rim 24 of the turbine wheel 22. For example, FIG. 2 shows a platform 44 that supports a pair of generators 46 and 48. Likewise, FIG. 1 shows a similar mounting of generators and platforms 44, 46 and 48 disposed in the lowermost arc of rotation of the turbine wheel 22 in a clock-wise direction as indicated by arrow 50.

Figure 3:
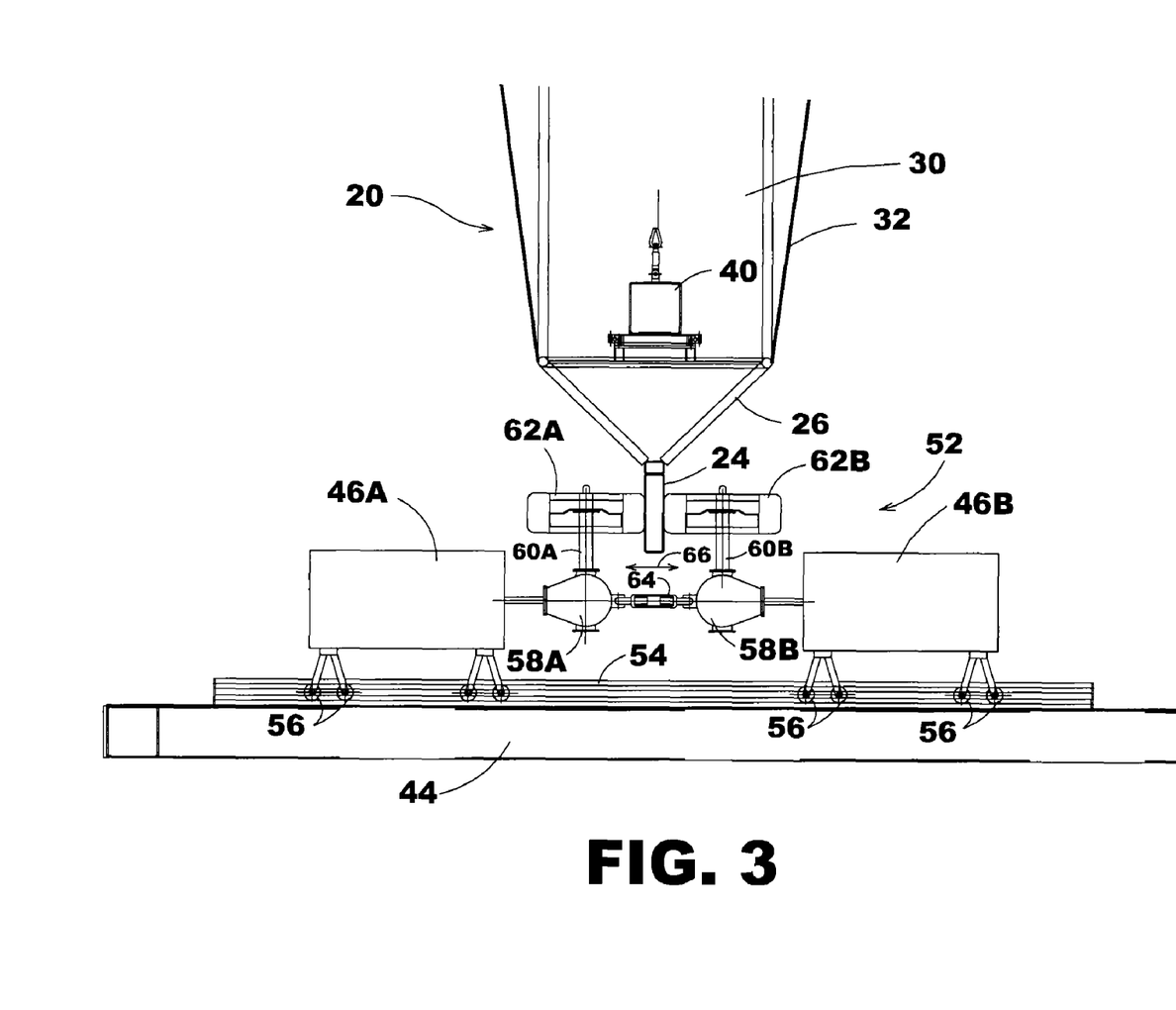
FIG. 3 is a detailed illustration of electrical generators and a portion of the perimeter of a turbine wheel, showing how the electrical generators may be driven by the circular perimeter rim of the wind turbine.

FIG. 3 shows a generator assembly 52 that includes the platform 44 and generators 46A and 46B. The generators are mounted on guide support rails 54, with an arrangement of rollers 56 engaging the rails 54. This allows the generators to be moved axially, in the direction of the axis of rotation of the turbine wheel, which is left and right as shown by the double headed arrow 66 in FIG. 3.

Each generator is connected to a reduction gear 58A, 58B, respectively, and drive shafts 60A and 60B extend from the reduction gears to a wheel member 62A, 62B, respectively. The wheel members may be conventional rubber tires mounted on rims, but other rotary type wheel members may be used, as desired.

Perimeter rim 24 has opposite facing parallel surfaces that are engaged by the wheel members 62. In order to assure proper engagement of the wheel members 62 with the perimeter rim 24, a turnbuckle 64 connects the reduction gear housings of the reduction gears 58 so that when the turnbuckle 64 is tightened, the wheel members compress against opposite surfaces of the perimeter rim 24, causing the wheel members 62 to rotate in response to circumferential movement of the perimeter rim 24.

With the arrangement of the generator assembly 52 of FIG. 3, it can be seen that should the perimeter rim 24 experience some axial movement or wobbling as indicated by arrows 66, the generator assembly will be able to move in the same directions and at the same amplitude of the axial movement 66 while the wheel members 62A and 62B retain positive engagement with the perimeter rim 24. Since the turnbuckle 64 tends to clamp the wheel members 62A and 62B into engagement with the perimeter rim 24, continuous rotary movement will be imparted from the perimeter rim 24 to the wheel members 62A and 62B, and the rotary motions from the wheel members will be transmitted through the drive shafts 60A and 60B, reduction gears 58A and 58B to the generators 46A and 46B.

Figure 4:
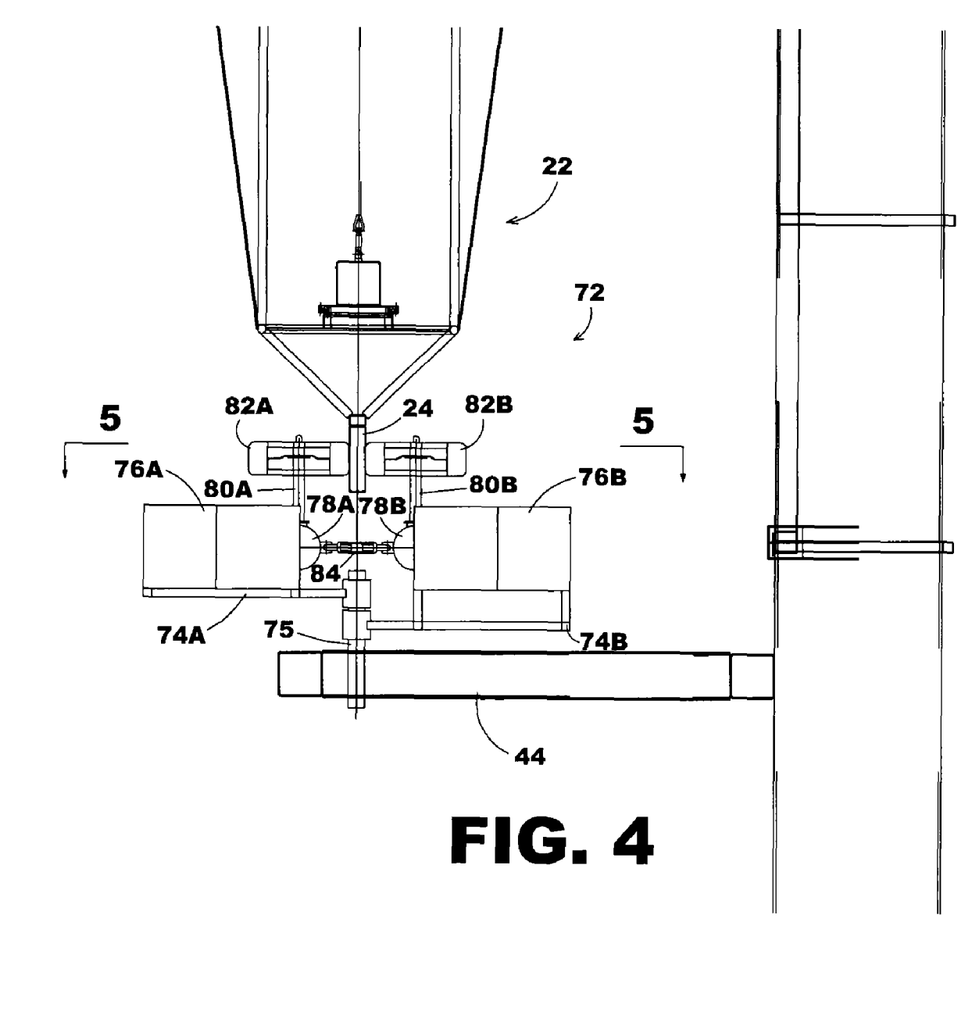
FIG. 4 is a detailed illustration, similar to FIG. 3, but showing the second arrangement of the electrical generators being driven by the perimeter circular rim of the turbine wheel.

FIG. 4 shows another form of generator assembly 72 which includes generators 76A and 76B that are mounted by horizontal support arms 74A and 74B, respectively, and the support arms are pivotally mounted to the upright support shaft 75 that is supported, in turn, by the platform 44.

The reduction gears 78A and 78B connect the generators 76A and 76B through the drive shafts 80A and 80B to the wheel members 82A and 82B that engage the perimeter rim 24. The turnbuckle 84 is connected to the reduction gears 78A and 78B, drawing the generators 76A and 76B, reduction gears 78A and 78B, and the wheel members 82A and 82B together so that the wheel members 82A and 82B make positive engagement with the perimeter rim 24 of the turbine wheel 22.

Figure 5:
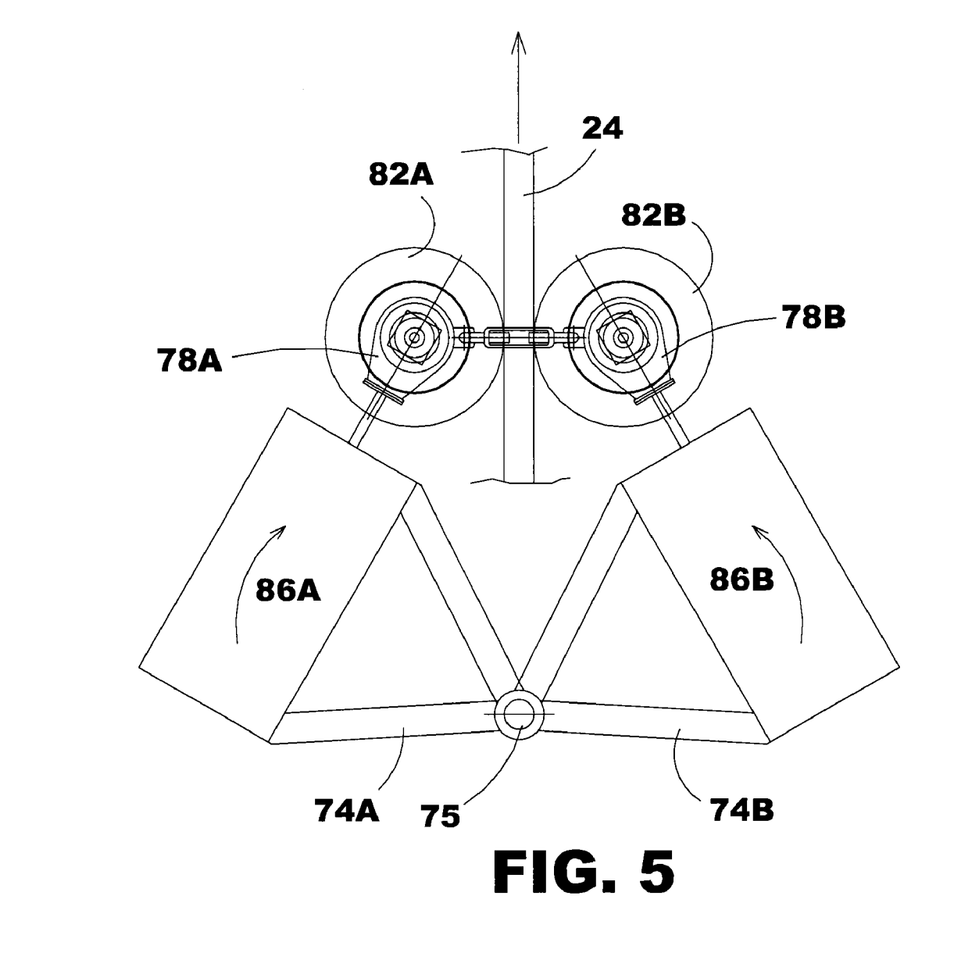
FIG. 5 is a plan view of the driven wheels and their respective generators of FIG. 4, taken along lines 5-5 of FIG. 4.

As shown in FIG. 5, which is a top view taken along lines 5-5 of FIG. 4, the horizontal support arms 74A and 74B are pivotally connected to the upright support shaft 75 so that they are movable about the upright support shaft 75 in arcs as indicated by the double-headed arrows 86A and 86B. This allows the wheel members 82A and 82B, the reduction gears 78A and 78B, and the generators 96A and 96B to oscillate in unison in the directions indicated by the arrows 86A and 86B, thereby compensating for axial movement of the perimeter rim 24.

Figure 6:
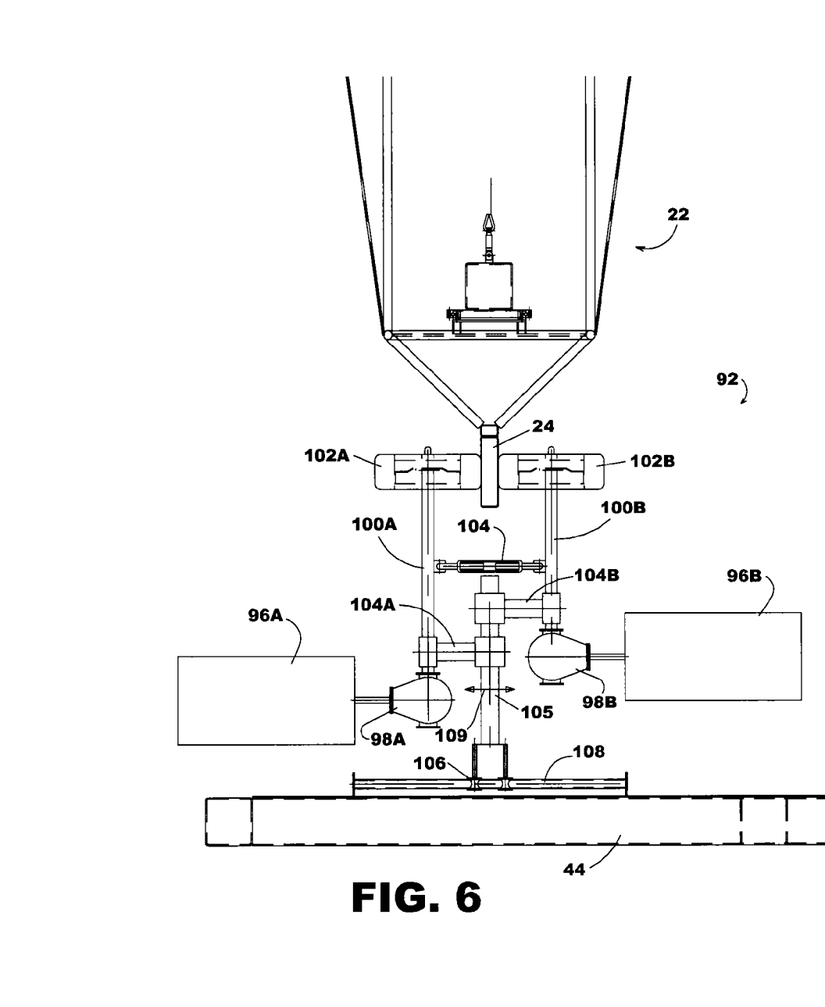
FIG. 6 is a side cross sectional view, similar to FIG. 4, showing a portion of the perimeter rim of a turbine wheel and another arrangement of the electrical generators that may be driven by the perimeter rim.

FIG. 6 shows yet another embodiment of the generator assembly 92. The generators 96A and 96B, their respective reduction gears 98A and 98B and their drive shafts 100A and 100B are driven by the wheel members 102A and 102B that are in engagement with the perimeter rim 24 of the turbine wheel 22. The turnbuckle 104 maintains the wheel members 102A and 102B in constant compressive contact with respect to the opposite facing surfaces of the perimeter rim 24. Horizontal support arms 104A and 104B support the drive shafts 100A and 100B on the upright support shaft 105, similar to that arrangement shown in FIG. 5.

The upright support shaft 105 of FIG. 6 is mounted on guide support rails 108 that are mounted in turn to the platform 44. The movable connection made by the rollers 106 against the guide support rails allows the generator assembly 92 to move axially, parallel to the axis of rotation of the turbine wheel, as indicated by double-headed arrow 109. This allows the generator assembly 92 to move in response to the axial movement or "wobbling" of the perimeter rim 24 so that the wheel members 102A and 102B maintain constant engagement with the perimeter rim 24.

Figure 7:
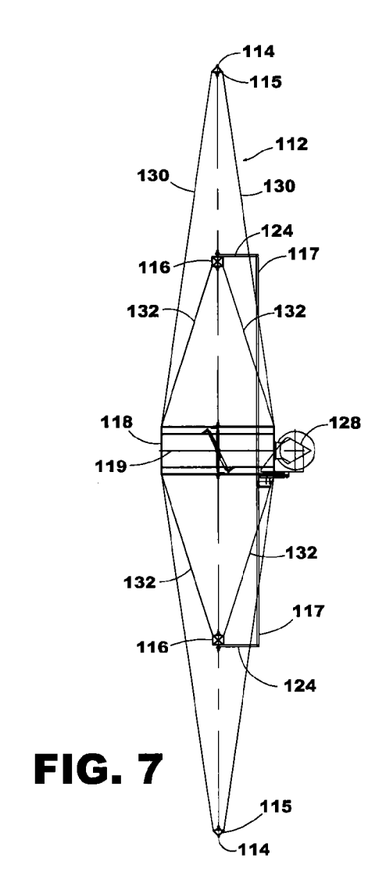
FIG. 7 is a side elevational view of another wind turbine, with the wind turbine having a circular perimeter rim and an intermediate circular rim, both concentric with the axis of rotation of the turbine wheel.
Figure 8:
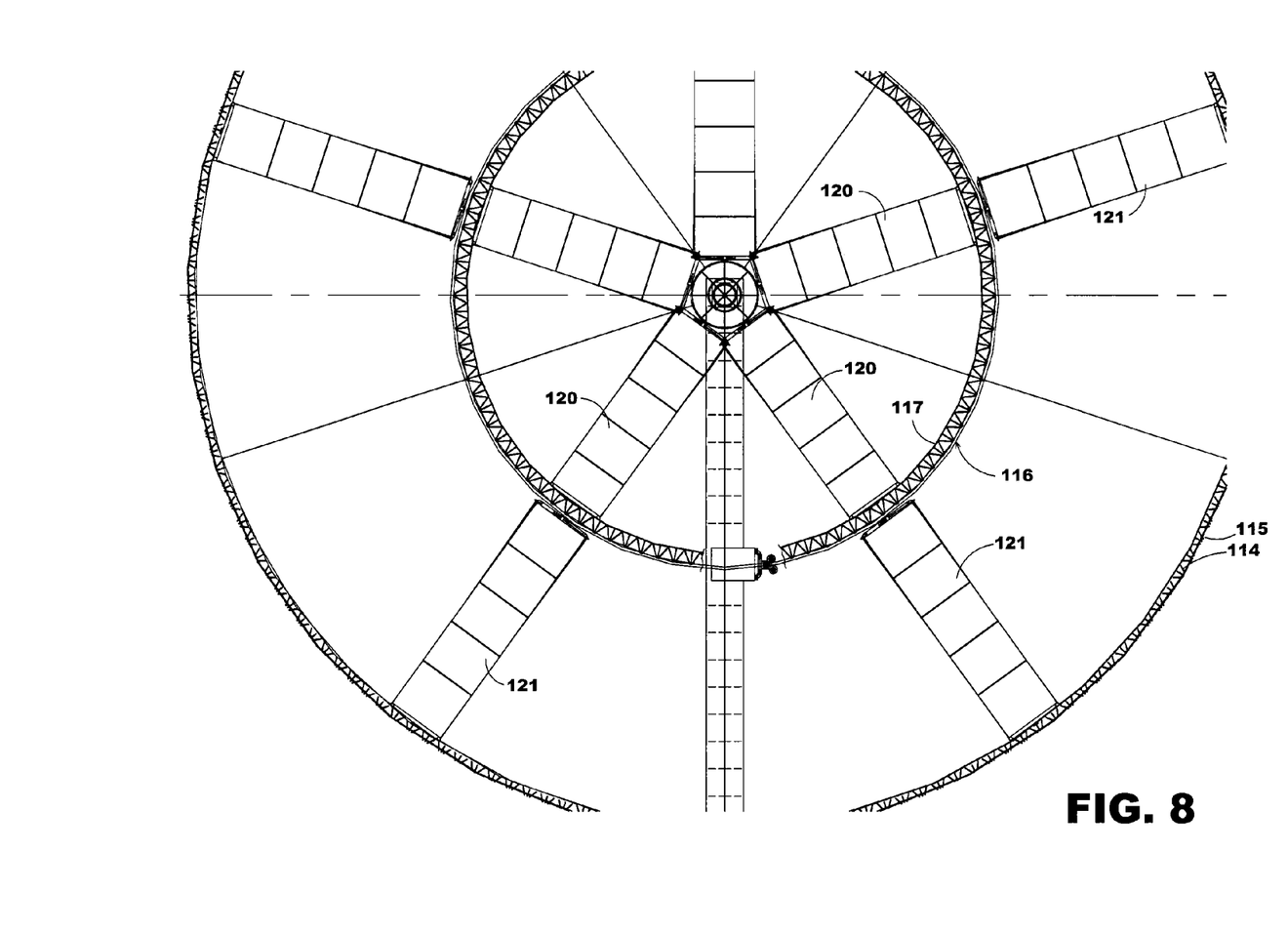
FIG. 8 is a partial front view of the wind turbine of FIG. 7, showing a portion of the turbine wheel that includes the intermediate circular rim and the electrical generators and their movable support in engagement with the intermediate rim.

FIG. 7 illustrates another embodiment of a wind turbine 110 that includes a turbine wheel 112 having a perimeter rim 114 and a perimeter framework 115 and an intermediate framework 116 and an intermediate rim 117. As shown in FIG. 8, the intermediate framework 116 is structured in a manner similar to the structure of the perimeter framework 114 in that it includes a network of angled braces and is formed in a circle that is coaxial with both the perimeter rim 114 and the central axis of rotation 119. A series of intermediate sail wings 120 are supported at their inner ends by the axle structure 118 and at their outer ends by the intermediate framework 116. Likewise, outer sail wing assemblies 121 are supported at their ends by intermediate framework 116 and perimeter framework 115.

As shown in FIG. 7, a series of axially extending spars 124 are supported by the intermediate framework 116, and intermediate rim 117 is supported by the spars 124. The intermediate rim 117 is positioned between the mast 128 and the cables 130 and 132 so that it is outside of the cables 130 and 132 that extend from the axle structure 118 out to the perimeter framework 115 and the intermediate framework 116.

Figure 9:
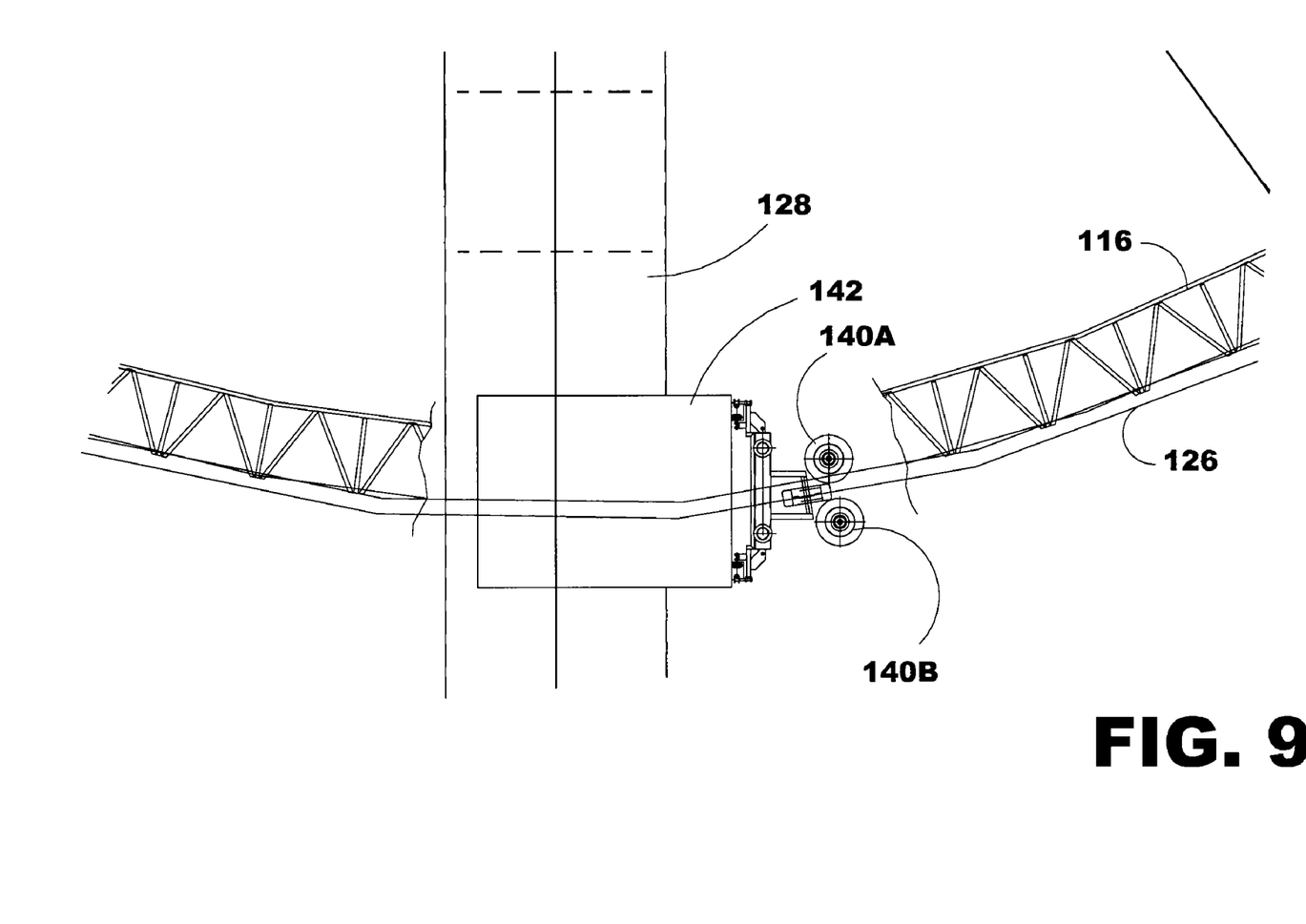
FIG. 9 is a closer front view to the electrical generators of FIG. 8.
Figure 10:
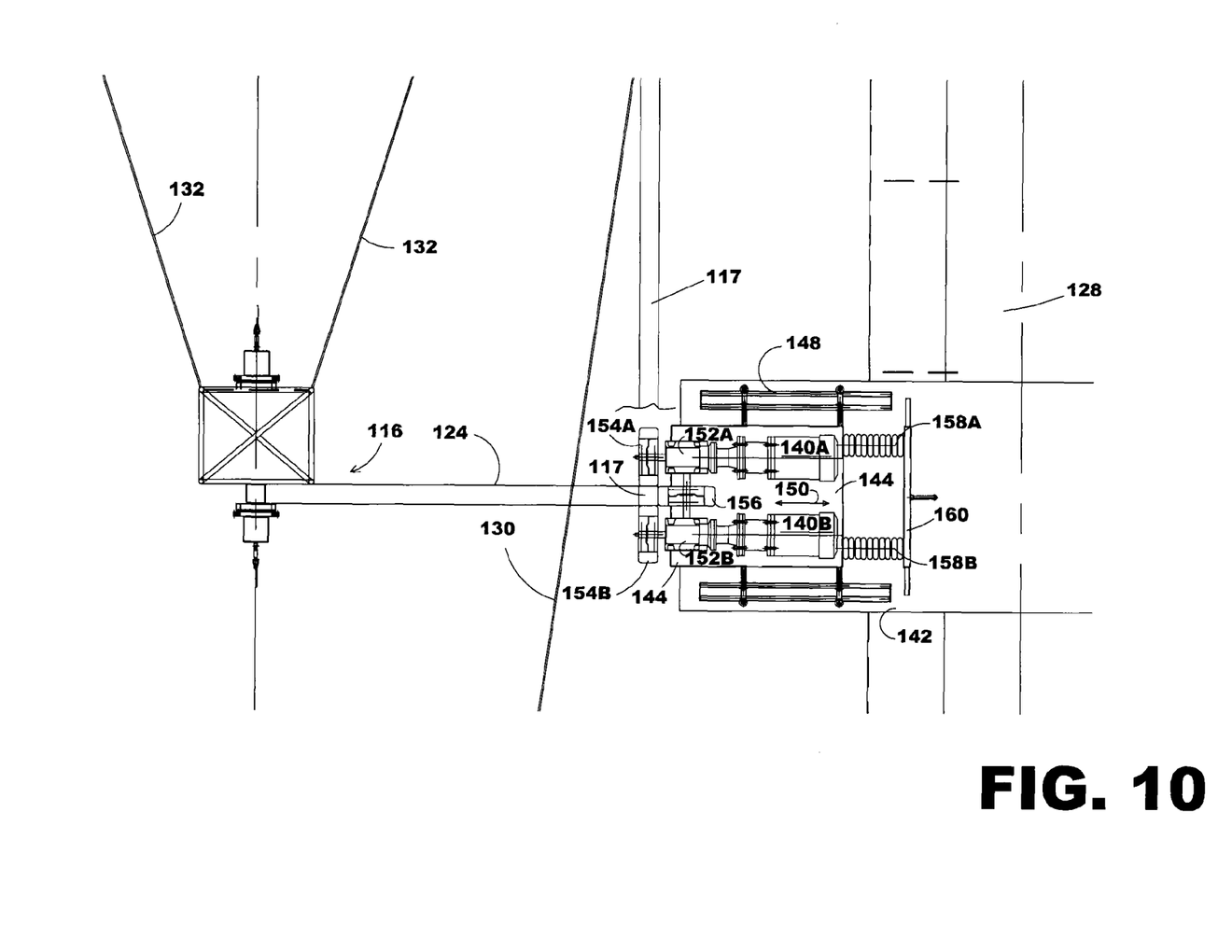
FIG. 10 is a side elevational view of a portion of an intermediate rim of a wind turbine and the associated electrical generators of FIG. 8, showing an alternate arrangement of the driven wheels, guide wheel, and electrical generators as mounted to the perimeter rim of the turbine wheel.

As shown in FIGS. 9 and 10, electrical generators 140A and 140B are supported adjacent the intermediate rim 117 in the lower arc of movement of the intermediate rim 117. Support plate 142 is rigidly mounted to the mast 128. The electrical generators 140A and 140B are mounted on movable support 144. Movable support 144 is mounted to guide support rails 148 so that the movable support 144 moves with respect to mast 128 as indicated by the double-headed arrow 150. The electrical generators 140A and 140B are operatively connected through the gear reducers 152A and 152B, and the gear reducers are connected in turn to the wheel members 154A and 154B, respectively. A turnbuckle (not shown in FIG. 10 but similar to turnbuckle 64 of FIG. 3) connects the gear reducers 152A and 152B together so that the wheel members are in positive engagement with the opposite surfaces of the intermediate rim 117 of the turbine wheel.

As shown in FIG. 10, guide wheel 156 is supported on the movable support 144 and engages the outward facing lateral surface of the intermediate rim 117.

At the other end of the movable support 144 is a biasing means for urging the guide wheel 156 into constant contact with the outward face of the intermediate rim 117. The biasing means may include bellows 158A and 158B that are backed at one end against a stationary plate 160 and which engage the adjacent edge of the movable support 144. In the alternative, a coil spring or other biasing means may be used to continuously urge the guide wheel 156 into engagement with the intermediate rim 117. This maintains the wheel members 154A and 154B in aligned contact with intermediate rim 117. Thus, if there is any axial wobbling of the intermediate rim 117, the guide wheel will follow the axial movement of the intermediate rim, moving the support 142, generators 140A and 140B and associated structure axially as shown by barrow 150, maintaining the wheel members 154 in constant contact with the intermediate rim 117. This avoids interruption of the rotary movement applied by the intermediate rim 117 to the wheel members 154A and 154B.

Figure 11:
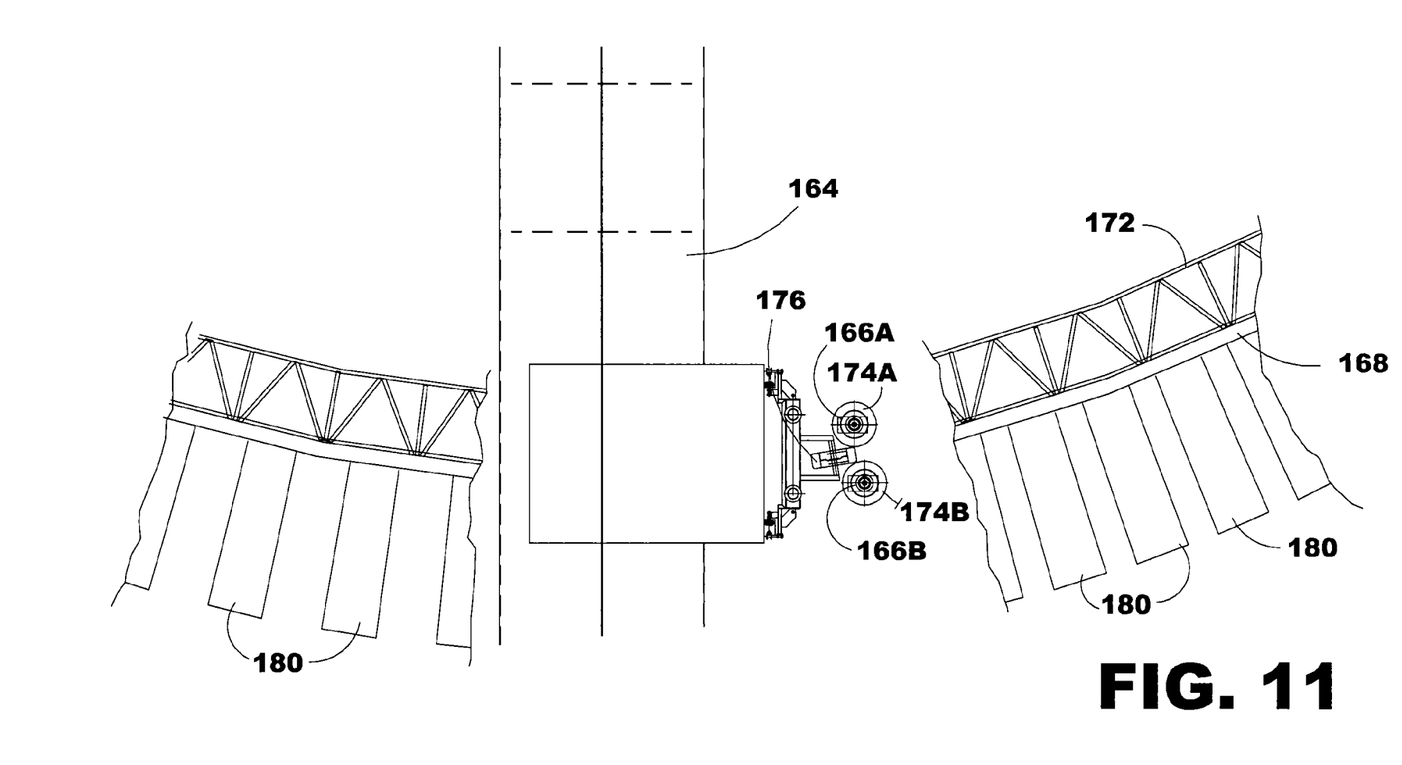
FIG. 11 is a close front view of the electrical generators, similar to FIG. 9, but showing the electrical generators engaging an offset perimeter rim.
Figure 12:
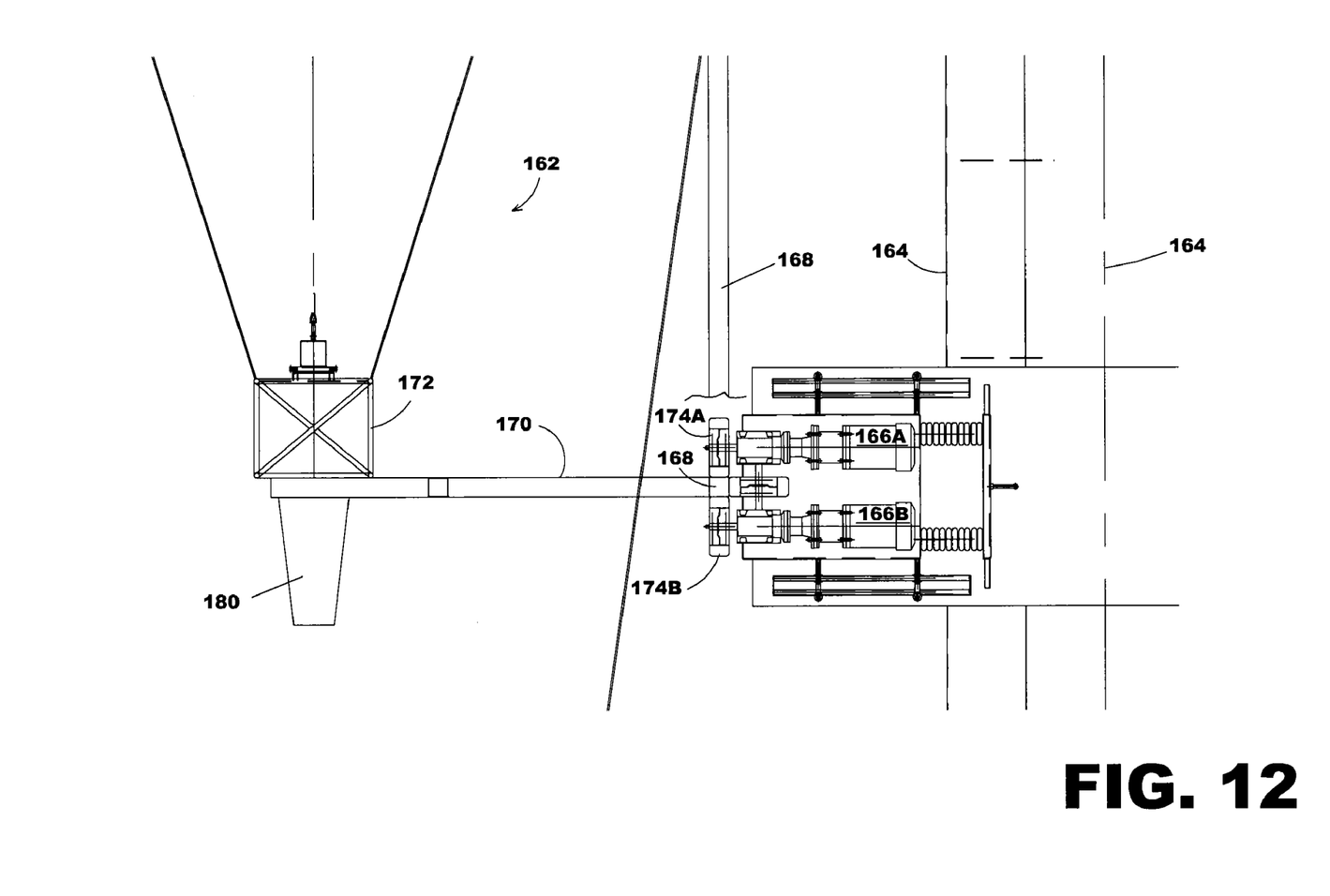
FIG. 12 is a side view of the turbine wheel of FIG. 11, showing the offset perimeter rim and the sailets extending radially from the perimeter framework.

FIGS. 11 and 12 show a turbine wheel 162, mast 164, and electrical generators 166A and 166B that are similar to those of FIG. 9. However, the perimeter rim 168 is offset from the perimeter framework 172, as shown in FIG. 12. The plurality of spars 170 support the perimeter rim 168 from the perimeter framework 172. The electrical generators are movably mounted with respect to the mast 164 as previously described so that the wheel members 174A and 174B engage opposite sides of the perimeter rim 168, as previously described. The guide wheel 176 bears against the adjacent surface of the perimeter rim 168, keeping the wheel members 174A and 174B in proper alignment with the perimeter rim 168.

A plurality of short sail wings, identified as "sailets," 180 are attached to the perimeter framework 172, extending radially outwardly from the perimeter framework 172. The sailets 180 are angled so as to form a pitch with respect to the oncoming atmospheric wind. The sailets typically will be rigid and relatively short in comparison to the sail wings of the turbine wheel so that they do not require additional support at their outer ends. The sailets provide additional surfaces for catching the wind and therefore increase the force of the rotary motion taken by the wind turbine from the oncoming wind.

It will be understood by those skilled in the art that while the foregoing description sets forth in detail preferred embodiments of the present invention, modifications, additions, and changes might be made thereto without departing from the spirit and scope of the invention, as set forth in the following claims.

The invention claimed is:

1. A wind turbine assembly for generating electricity, comprising:
   a turbine wheel support member,
   a wind turbine wheel mounted on said turbine wheel support member, said wind turbine wheel including a laterally extending central axis of rotation, a circular perimeter rim concentric with and rotatable about said central axis of rotation, and a circular intermediate rim concentric with said perimeter rim and positioned between said perimeter rim and said central axis of rotation and rotatable about said central axis of rotation,
   intermediate sail wings supported between said central axis of rotation and said circular intermediate rim, and outer sail wings supported between said circular intermediate rim and said circular perimeter rim,
   an electrical generator mounted in engagement with one of said circular intermediate rim and said circular perimeter rim for generating electricity in response to the rotation of said wind turbine wheel, a movable support configured for supporting said electrical generator and for moving said electrical generator in response to a change in the axial position of said one of said circular intermediate rim and said circular perimeter rim at the electrical generator, and a positioning wheel carried by said movable support and in contact with one of said perimeter rim and said intermediate rim for moving said movable support in response to the change of position of the circular rim at said movable support.

2. The wind turbine assembly of claim 1 and wherein said positioning wheel includes a pair of wheels straddling said one of said circular intermediate rim and said circular perimeter rim and in driving relationship with said electrical generator.

3. The wind turbine assembly of claim 2 wherein said movable support further includes biasing means for urging said positioning wheel into contact with one of said circular intermediate rim and said circular perimeter rim.

4. The wind turbine assembly of claim 3 wherein said biasing means includes an air bellows.

5. The wind turbine assembly of claim 3 wherein said biasing means includes a spring.

6. A wind turbine assembly for generating electricity, comprising:
a turbine wheel support member,
a wind turbine wheel mounted on said turbine wheel support member, said wind turbine wheel including a laterally extending central axis of rotation and a circular rim rotatable about said central axis of rotation,
sail wings supported by said circular rim,
an electrical generator mounted in driven relationship with said circular rim for generating electricity in response to the rotation of said wind turbine wheel,
a movable support configured for moving in response to a change in the position of said circular rim at the electrical generator for maintaining said electrical generator in driven relationship with said circular rim,
a positioning wheel carried by said movable support and in contact with said circular rim for moving said movable support in response to the change of position of the circular rim at said movable support, and
at least one driving wheel carried by said movable support in contact with said circular rim and connected to said electrical generator for driving said electrical generator in response to the rotation of said wind turbine wheel.

7. The wind turbine assembly for generating electricity of claim 6, wherein
said circular rim includes a laterally facing surface and opposed vertically facing surfaces,
said positioning wheel engages said laterally facing surface of said circular rim, and said at least one driving wheel comprises a pair of opposed driving wheels each engaging one of said opposed vertically facing surfaces of said circular rim.

8. The wind turbine assembly for generating electricity of claim 6, wherein
said electrical generator comprises a pair of electrical generators,
said at least one driving wheel comprises a pair of driving wheels for engaging opposite sides of said circular rim, and
each driving wheel of said pair of driving wheels in driving engagement with one of said electrical generators of said pair of electrical generators.

9. The wind turbine assembly for generating electricity of claim 6, wherein said movable support is mounted on a bearing.

10. The wind turbine assembly for generating electricity of claim 9, wherein said bearing is formed of wheels.

11. The wind turbine assembly for generating electricity of claim 6, and further including sailets extending radially from said circular rim.

12. The wind turbine assembly of claim 6, wherein
said movable support includes bellows configured maintaining said positioning wheel in contact with said circular rim during lateral movements of said rotor.

13. A wind turbine assembly comprising:
a support,
a turbine wheel rotatably mounted on said support about a laterally extending central axis,
said turbine wheel including a circular rim concentric with and rotatable about said central axis, said circular rim including opposed surfaces,
an electrical generator assembly in driven relationship with said circular rim,
said electrical generator assembly including a pair of driving wheels for straddling said circular rim in driven relationship with said opposed surfaces of said circular rim, and including an electrical generator in driven relationship with each of said driving wheels,
biasing means configured for maintaining said driving wheels in driven relationship with said circular rim, and
a positioning wheel in contact with said circular rim and configured for moving said electrical generators in response to the change of position of the circular rim at said positioning wheel.

14. The wind turbine assembly of claim 13, wherein said biasing means comprises a turn buckle.

15. The wind turbine assembly of claim 13, and wherein said pair of driving wheels comprises one wheel in driving relationship with one electrical generator and a second wheel in driving relationship with another electrical generator.

16. A wind turbine assembly comprising:
a turbine wheel rotatably mounted about a laterally extending central axis,
said turbine wheel including a circular rim concentric with and rotatable about said central axis, a plurality of sail wings each including an inner end and an outer end, and a longitudinal axis extending between said inner end and said outer end and extending radially from said central axis to said circular rim,
said sail wings are formed of fiberglass and are bendable about their longitudinal axis,
an electrical generator in driven relationship with said circular rim, and
a pair of wheels for engaging opposite surfaces of said circular rim for driving said electrical generator,
biasing means configured for urging said pair of wheels into engagement with said opposite sides of said rim, and
a positioning member positioned adjacent said circular rim and configured for moving said electrical generator in response to the change of position of the circular rim at said electrical generator.

17. The wind turbine assembly of claim 16, wherein said rim is supported by cables extending between said rim and said laterally extending central axis.

* * * * *